(12) United States Patent
Ootomo et al.

(10) Patent No.: US 6,291,789 B1
(45) Date of Patent: Sep. 18, 2001

(54) WIRE ELECTRICAL DISCHARGE MACHINE

(75) Inventors: Youichi Ootomo; Toshio Moro, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/598,918

(22) Filed: Jun. 22, 2000

Related U.S. Application Data

(63) Continuation of application No. PCT/JP97/04750, filed on Dec. 22, 1997.

(51) Int. Cl.[7] ..................................................... B23H 7/10
(52) U.S. Cl. ............................................................ 219/69.12
(58) Field of Search ............................... 219/69.12, 69.14

(56) References Cited

FOREIGN PATENT DOCUMENTS

| | | | |
|---|---|---|---|
| 59-14428 | * | 1/1984 | (JP) .................................. 219/69.12 |
| 64-20929 | | 1/1989 | (JP) . |
| 4-2418 | * | 1/1992 | (JP) .................................. 219/69.12 |
| 4-105822 | | 4/1992 | (JP) . |
| 5-92322 | | 4/1993 | (JP) . |
| 7-29246 | | 4/1995 | (JP) . |

OTHER PUBLICATIONS

International Search Report.

* cited by examiner

*Primary Examiner*—Geoffrey S. Evans
(74) *Attorney, Agent, or Firm*—Sughrue, Mion, Zinn, Macpeak & Seas, PLLC

(57) ABSTRACT

A wire electrical discharge machine includes a wire electrode for causing electrical discharge to take place between the wire electrode and a workpiece; a first roller and a second roller for feeding the wire electrode while nipping the wire electrode; wire conveyor for inserting the wire electrode into a portion between the first roller and the second roller by causing a fluid to flow to opposing portions of the first roller and the second roller; and driver for moving a distal end of the wire conveyor to a vicinity of the opposing portions, and for moving the distal end of the wire conveyor away from the opposing portions a predetermined distance upon completion of the insertion of the wire electrode into the nip between the first roller and the second roller.

5 Claims, 5 Drawing Sheets

WIRE ELECTRICAL DISCHARGE MACHINE

This Application is a Continuation of PCT/JP97/04750 filed Dec. 22, 1997.

BACKGROUND OF THE INVENTION

1. Field of the Invention

The present invention relates to improvements in a wire electrical discharge machine, and more particularly to a wire electrical discharge machine which prevents a fluid from coming into contact with a capstan roller and a pinch roller, and in which a wire electrode is difficult to become intangled with the rollers.

2. Description of the Related Art

A conventional wire electrical discharge machine will be described with reference to FIGS. 6 to 7 disclosed in JP-A-4-105822. In FIGS. 6 and 7, the wire electrical discharge machine is a machine tool wherein a phenomenon of electric discharge is caused to take place between a wire electrode 1 and a workpiece 3 to perform cutting-out processing with respect to the workpiece 3 such as a superalloy. At the time of starting discharge machining, the wire electrode 1 must be inserted in advance in a start hole formed in the workpiece 3, and the wire electrode 1 must always be fed during wire electrical discharge machining.

The wire electrical discharge machine comprises a mounting surface plate 5 for mounting the workpiece 3 thereon; a processing tank 7 for keeping the workpiece 3 and the mounting surface plate 5 immersed in a working fluid 60a; a guide means 8 for guiding the wire electrode 1; a lower idler 20 for converting the direction of the wire electrode 1 being fed from a lower portion of the workpiece 3 into a horizontal direction; a wire conveying means 22 for conveying the wire electrode 1 and having a pipe-shaped portion; a wire taking-up means 30 for taking up the wire electrode 1; a cylinder 50 for moving the wire taking-up means 30 in the horizontal direction; a working-fluid supplying section 60 for supplying the working fluid 60a to the wire conveying means 22; and a collecting section 75 including a shielding plate 72 and a collecting box 74.

The wire conveying means 22 comprises a hollow cylindrical inlet portion 22a into which the wire electrode 1 is inserted and the working fluid 60a is allowed to flow from a side surface thereof; a hollow cylindrical guide member 23 connected to this inlet portion 22a; and a nozzle member 25 which envelops the guide member 23 and is formed slidably around an outer peripheral surface of the guide member 23 and which is larger than the guide member 23. As a rod 50a of the cylinder 50 is extended or retracted, the wire conveying means 22 moves the overall wire taking-up means 30 in the horizontal direction, and is adapted to allow the nozzle member 25 to be movable in synchronism therewith.

The wire taking-up means 30 includes a capstan roller 34 serving as a first roller for nipping and taking up the wire electrode 1, a lever-type pinch roller 36 serving as a second roller, and a motor 32 for rotating the capstan roller 34.

The working-fluid supplying section 60 includes a storage tank in which the working fluid 60a is stored, a first pump 64 for pumping up the working fluid 60a from the storage tank 62 and supplying it to the processing tank 7, and a second pump 66 for supplying the working fluid 60a to the wire conveying means 22 in a similar manner.

Referring to FIGS. 6 and 7, a description will be given of the operation of the wire electrical discharge machine constructed as described above. First, the wire electrode 1 is passed through a machining portion 3a of the workpiece 3, undergoes a change in its direction by the lower idler 20, and is inserted in the inlet portion 22a of the wire conveying means 22.

Next, the second pump 66 is started, and the working fluid 60a pumped up from the storage tank 62 passes through the interior of the wire conveying means 22. A conveying force is hence imparted to the wire electrode 1 by the flow of the working fluid 60a as shown in FIG. 6, so that the wire electrode 1 is automatically fed to the wire taking-up means 30 and automatically drops into the collecting box 74. This drop is detected by an unillustrated detector to stop the second pump 66.

Next, the cylinder 50 is driven to move the wire taking-up means 30 to a position above the collecting box 74 and stops as shown in FIG. 7, and electrical discharge machining is effected. At this time, the wire electrode 1 which is continuously fed to the machining portion 3a of the workpiece 3 is collected in the collecting box 74.

However, there has been a problem in that when, during electrical discharge machining, the working fluid 60a flows from the processing tank 7 to the capstan roller 34 through the lower idler 20 and the wire conveying means 22, and the working fluid 60a is attached to the capstan roller 34, the wire electrode 1 becomes liable to be entangled with the roller 34 due to the surface tension of the working fluid 60a.

SUMMARY OF THE INVENTION

The present invention has been devised to overcome the above-described problem, and its object is to provide an electrical discharge machine in which the working fluid is difficult to be transmitted to the rollers during machining.

To attain this object, in accordance with a first aspect, there is provided a wire electrical discharge machine characterized by comprising: a wire electrode for causing electrical discharge to take place between the same and a workpiece; a first roller and a second roller for feeding the wire electrode while nipping the same; wire conveying means for inserting the wire electrode into a nip between the first roller and the second roller by causing a fluid to flow to opposing portions of the first roller and the second roller; and driving means for moving a distal end of the wire conveying means to a vicinity of the opposing portions, and for moving the distal end of the wire conveying means away from the opposing portions a predetermined distance upon completion of the insertion of the wire electrode into the nip between the first roller and the second roller.

In accordance with a second aspect, the wire electrical discharge machine is characterized in that the wire conveying means is provided with a hole formed therein.

In accordance with a third aspect, there is provided a wire electrical discharge machine characterized by comprising: a wire electrode for causing electrical discharge to take place between the same and a workpiece; a first roller and a second roller for feeding the wire electrode while nipping the same; and wire conveying means for inserting the wire electrode into a nip between the first roller and the second roller by causing a fluid to flow to opposing portions of the first roller and the second roller, wherein the wire conveying means includes a guide member for guiding the wire electrode by allowing the wire electrode to be inserted in a hollow portion of a main body thereof, a nozzle member engaging on an outer peripheral surface of the guide member in such a manner as to be slidably movable thereon, and fluid driving means for moving a tip of the nozzle member to a vicinity of the opposing portions by the hydraulic pressure of the fluid, and for moving the tip of the nozzle member away from the opposing portions when the influx of the fluid substantially stops.

In accordance with a fourth aspect, there is provided a wire electrical discharge machine characterized by comprising: a wire electrode for causing electrical discharge to take place between the same and a workpiece; a first roller and a second roller for feeding the wire electrode while nipping the same; and wire conveying means for inserting the wire electrode into a nip between the first roller and the second roller by causing a fluid to flow to opposing portions of the first roller and the second roller, wherein the wire conveying means includes: a guide member for guiding the wire electrode by allowing the wire electrode to be inserted in a hollow portion of a main body thereof, the guide member having a branch portion from which the fluid is separated; a nozzle member having a trunk portion provided with a hollow portion engaged slidably on an outer peripheral surface of the main body portion of the guide member, a tip portion which tapers off from the trunk portion, and a collar portion provided on a side of the nozzle member away from the tip portion; a substantially tubular case member which is slidably engaged on outer peripheral surfaces of the collar portion and the trunk portion of the nozzle member, which is fixed to an outer peripheral surface of the main body portion of the guide member, and which is connected to an outlet of the branch portion of the guide member; and a resilient member which is interposed between an inner surface of the case member and a side surface of the collar portion of the nozzle member, the resilient member being adapted to shrink when the hydraulic pressure of the fluid flowing out from the branch portion is applied to the collar portion of the nozzle member, and being adapted to extend as the hydraulic pressure is canceled.

In accordance with a fifth aspect, the wire electrical discharge machine is characterized in that the predetermined distance is more than a distance at which the fluid is difficult to come into contact with the first roller and the second roller.

DETAILED DESCRIPTION OF THE PRESENT INVENTION

Next, a description will be given hereafter of the embodiments of the present invention.

(First Embodiment)

Figure 1:
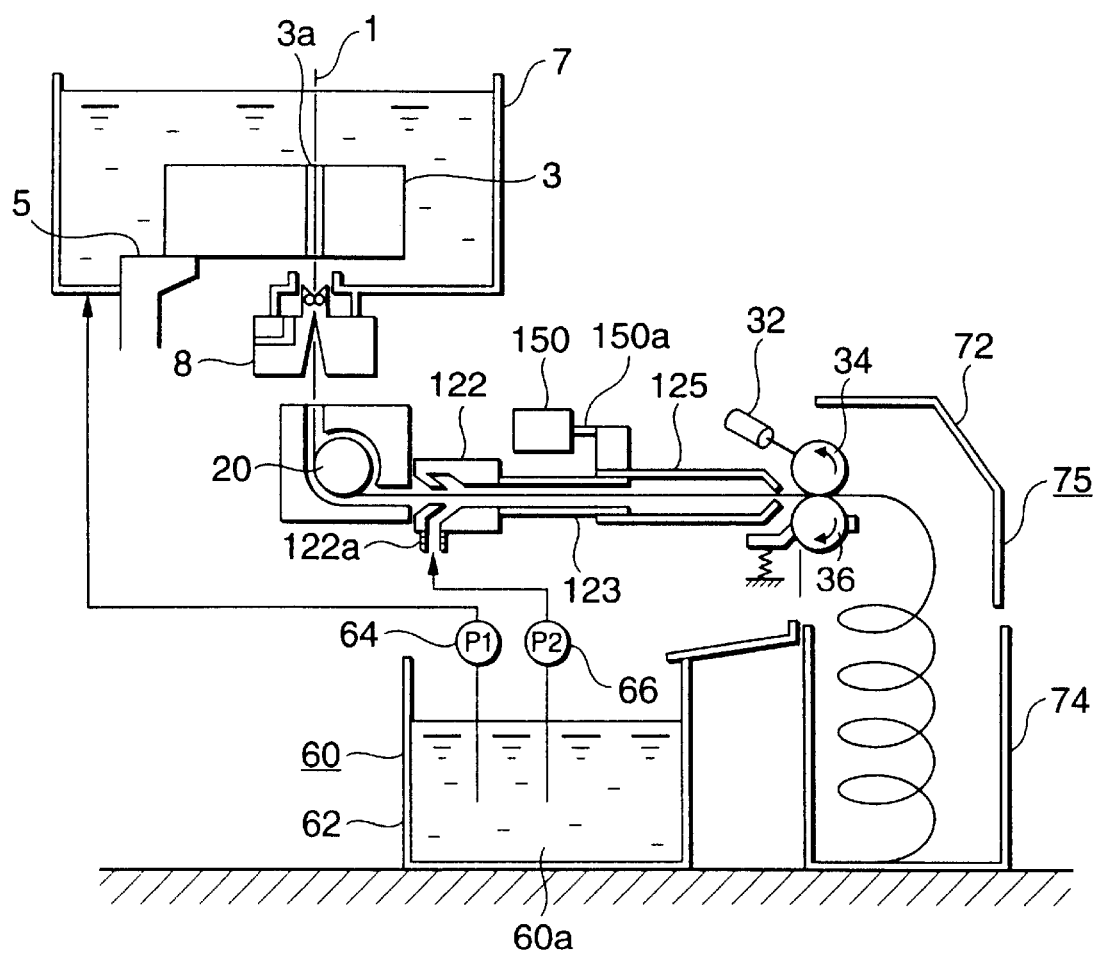
FIG. 1 is a schematic diagram of a wire electrical discharge machine in accordance with an embodiment of the invention.
Figure 2:
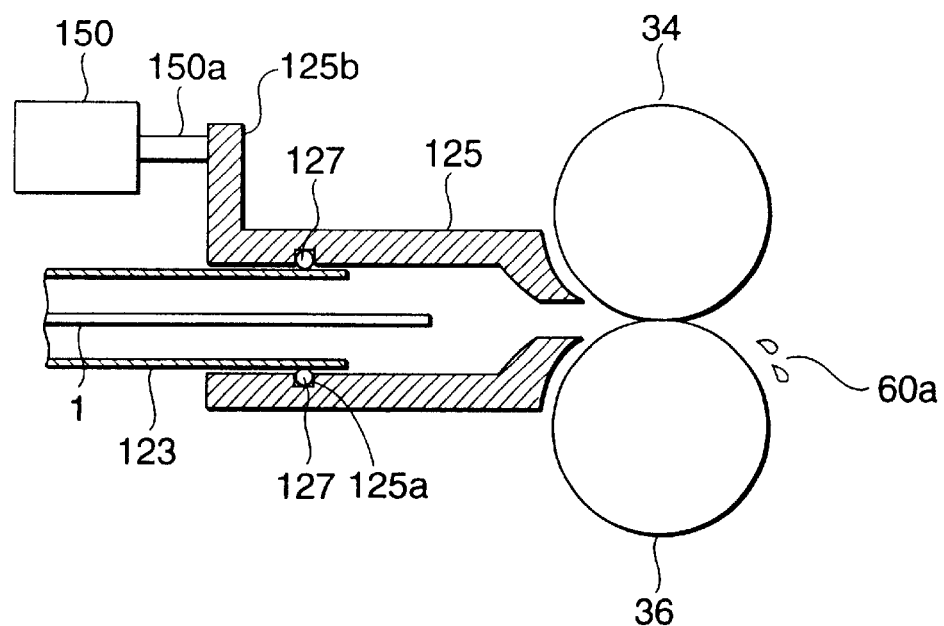
FIG. 2 is a front elevational view, partly in section, of a wire conveying means in a state in which a wire electrode is inserted into a nip between a pair of rollers in FIG. 1.
Figure 3:
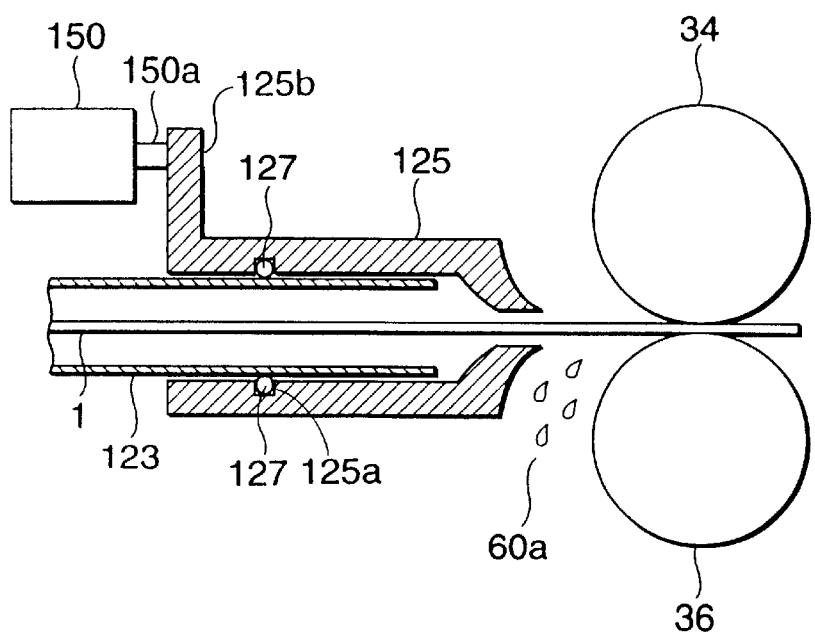
FIG. 3 is a front elevational view, partly in section, of the wire conveying means after wire electrode is inserted into the nip between the pair of rollers in FIG. 1.

Referring to FIGS. 1 to 3, a description will be given of an embodiment of the invention. FIG. 1 is a schematic diagram of a wire electrical discharge machine, and FIG. 2 is a partially enlarged view of FIG. 1, illustrating a wire conveying means and rollers, and shows a state in which a wire electrode is inserted into a nip between the rollers. FIG. 3 is a partially enlarged view of FIG. 1, illustrating the wire conveying means and the rollers, and shows a state after the wire electrode has been inserted into a nip between the rollers. In the drawings, those reference numerals that are identical to those for the conventional art denote identical or corresponding portions, and a description thereof will be omitted.

In FIGS. 1 to 3, a wire conveying means 122 comprises an inlet portion 122a into which a wire electrode 1 is inserted and a working fluid 60a is allowed to flow from a side surface thereof; a hollow cylindrical guide member 123 connected to this inlet portion 122a; a nozzle member 125 which envelops the guide member 123 and is formed slidably around an outer peripheral surface of the guide member 123 and which is larger than the guide member 123; and a seal packing 127 engaged and fixed in a groove 125a provided circumferentially in an inner peripheral surface of the nozzle member 125. The arrangement provided is such that a rod 150a of a cylinder 150 serving as a driving means is fixed to a substantially square mounting portion 125b provided on a side end portion of the nozzle member 125, and as the rod 150a of the cylinder 150 is moved horizontally, the nozzle member 125 is moved close to or away from opposing portions (if the rollers are in contact with each other, both opposing surfaces and abutting surfaces) of rollers 34 and 36.

Referring to FIGS. 1 to 3, a description will be given of the operation of the wire electrical discharge machine constructed as described above. First, the wire electrode 1 is passed through a machining portion 3a of a workpiece 3, undergoes a change in its direction by a lower idler 20, and is inserted in the wire conveying means 122.

The cylinder 150 is actuated to extend its rod 150a, and after a tip of the nozzle member 125 of the wire conveying means 122 is thereby made to approach the opposing surfaces of the capstan roller 34 and the pinch roller 36 as shown in FIG. 2, a second pump 66 is started, and the working fluid 60a pumped up from a storage tank 62 passes through the interior of the inlet portion 122a, the guide member 123, and the nozzle member 125. A conveying force is hence imparted to the wire electrode 1 by the flow of the working fluid 60a, and the wire electrode 1 is inserted into a nip formed by the opposing surfaces of the capstan roller 34 and the pinch roller 36.

A motor 32 is driven to take up the wire electrode 1 by the capstan roller 34 and the pinch roller 36, and the wire electrode 1 automatically drops into a collecting box 74. This drop is detected by an unillustrated detector to stop the second pump 66.

Upon this detection, as shown in FIG. 3, the cylinder 150 is actuated to retract the rod 150a, so that a tip of the nozzle member 125 of the wire conveying means 122 is moved away a predetermined distance from the opposing surfaces of the capstan roller 34 back to its initial position, and in such a state electrical discharge machining is started. Accordingly, the working fluid 60a in a processing tank 7 flows along the interior of the wire conveying means 122, flows down from the tip of the nozzle member 125, and drops short of the capstan roller 34 and the pinch roller 36 without coming into contact with them.

Figure 4:
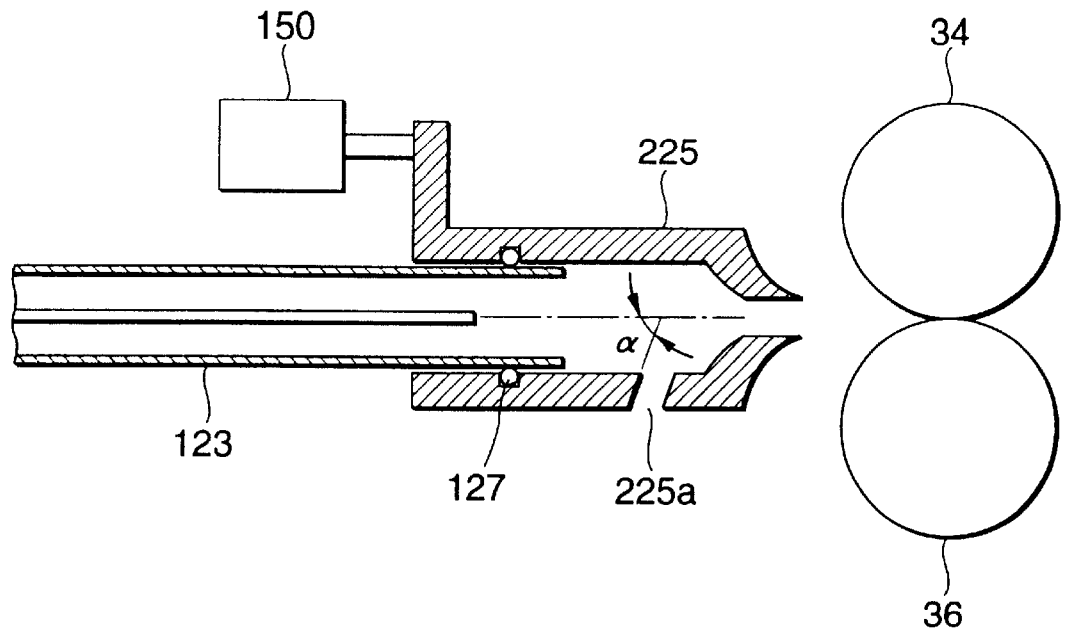
FIG. 4 is a front elevational view, partly in section, of the wire conveying means in accordance with another embodiment of the invention.

It should be noted that, as shown in FIG. 4, a nozzle member 225 is provided with a hole 225a which is formed in its bottom portion such that the angle α between the hole 225a and the wire electrode 1 assumes an acute angle. When the wire electrode 1 is inserted into a nip formed by the opposing surfaces of the capstan roller 34 and the pinch roller 36, even if the wire electrode 1 passes through the hollow interior of the nozzle member 225, the wire electrode 1 is difficult to be caught at the hole 225a. After the wire electrode 1 is inserted in the nozzle member 225, the tip of the nozzle member 225 is again moved away the predetermined distance from the opposing surfaces of the capstan roller 34 and the pinch roller 36, and the working fluid 60a flows down from the tip of the nozzle member 225 and through the hole 225a.

Accordingly, since the working fluid 60a drops also through the hole 225a in the nozzle member 225, the aforementioned predetermined distance can be made shorter than the case where the hole 225a is not provided. It should be noted that the hole 225a in the nozzle member 225 may be also provided in an upper portion and a side surface portion from the viewpoint of shortening the predetermined distance, and it goes without saying that the angle is not limited to a particular angle.

(Second Embodiment)

Figure 5:
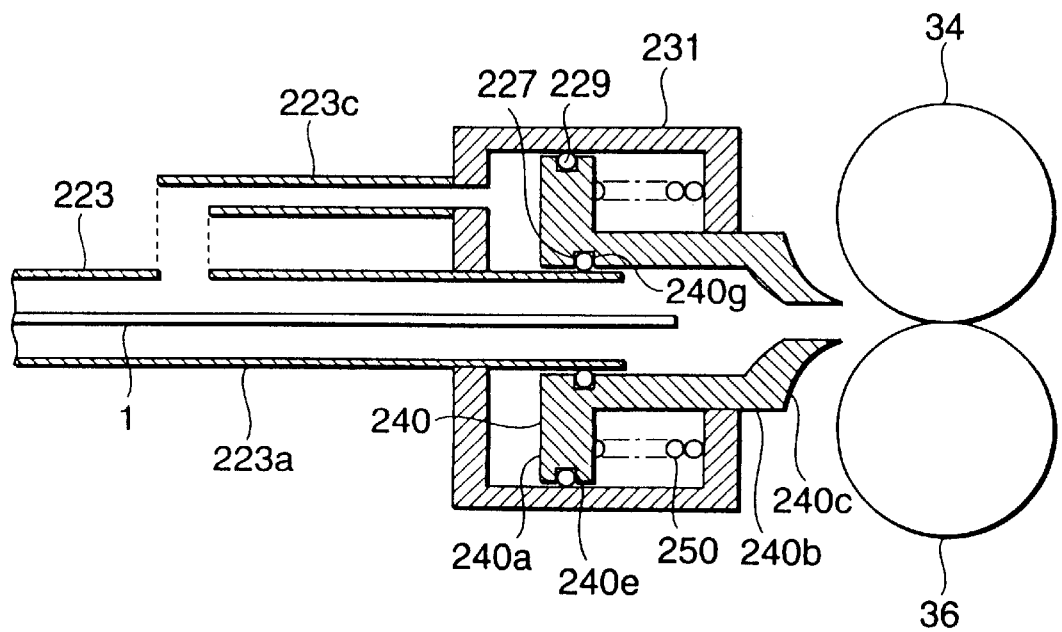
FIG. 5 is a front elevational view, partly in section, of the wire conveying means in accordance with still another embodiment of the invention.
Figure 6:
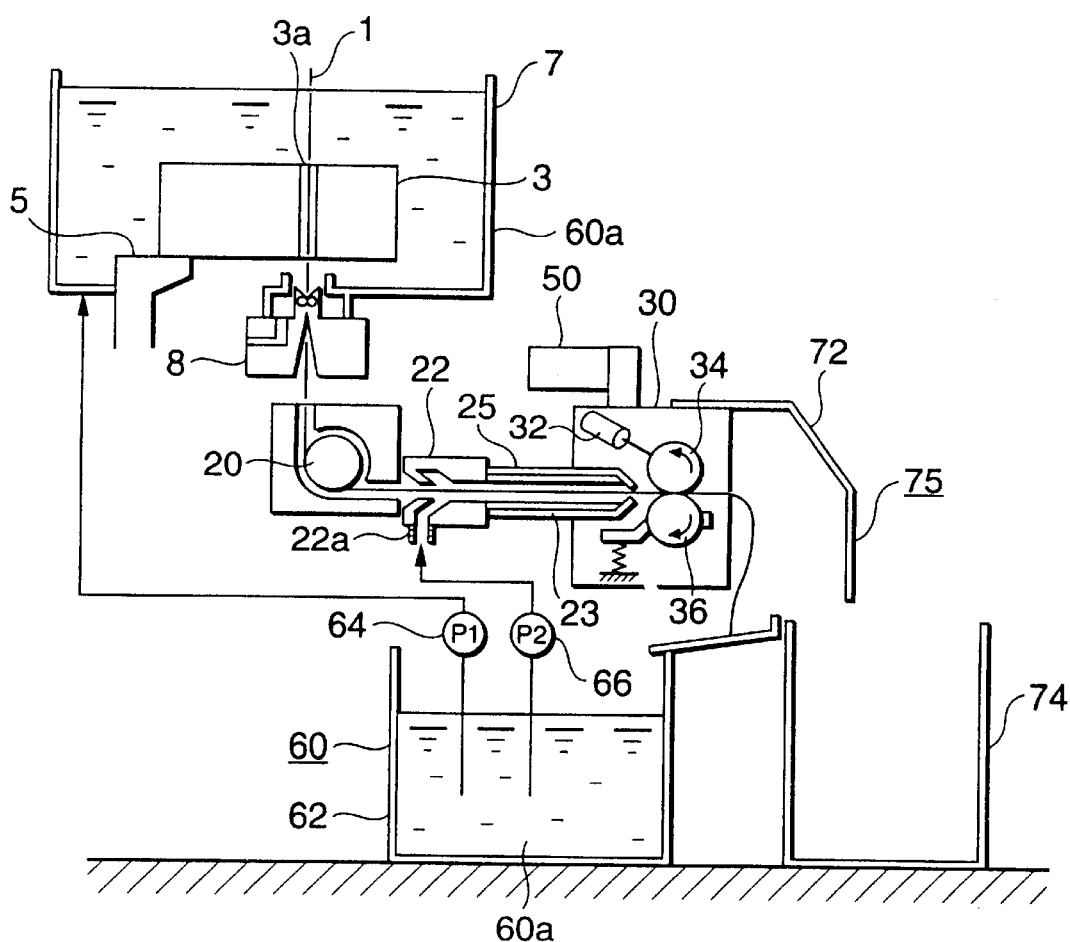
FIG. 6 is a schematic diagram of a conventional wire electrical discharge machine.
Figure 7:
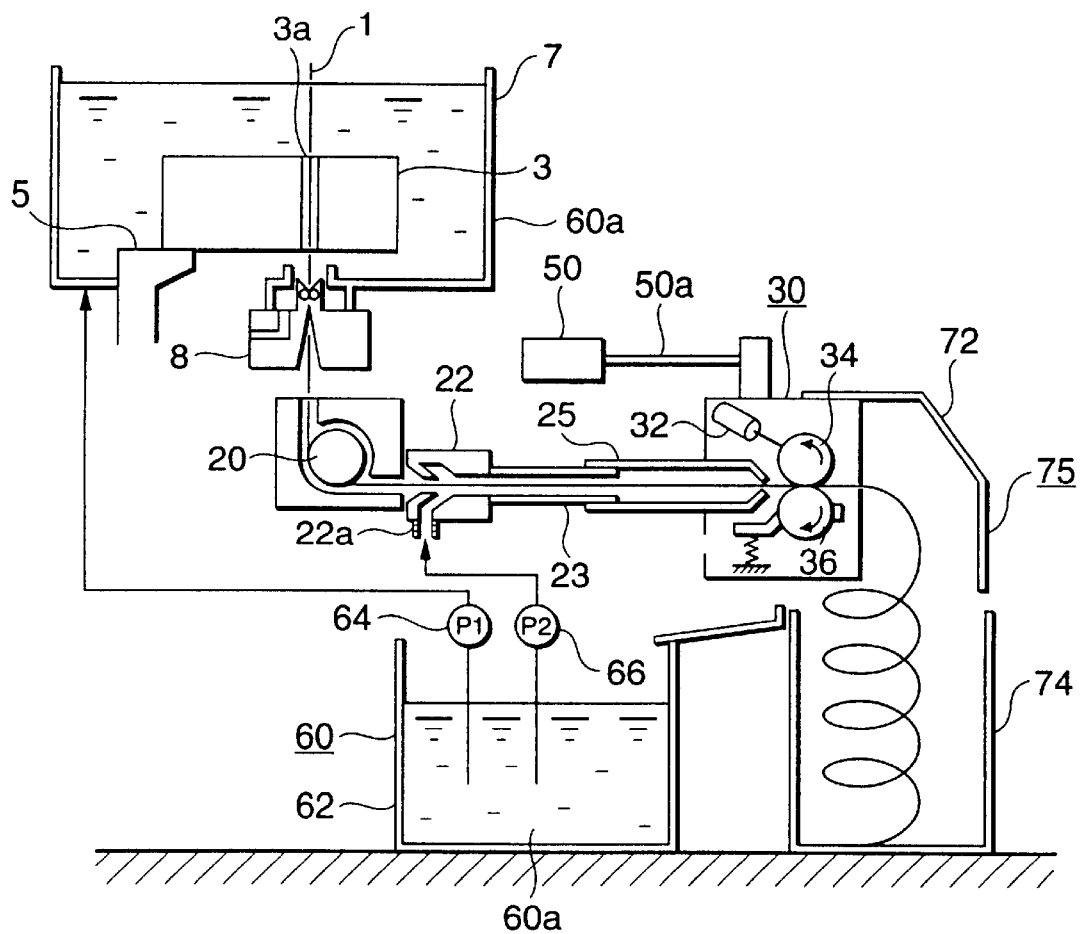
FIG. 7 is a schematic diagram of the conventional wire electrical discharge machine.

Another embodiment of the invention will be described with reference to FIG. 5. FIG. 5 is a front elevational view, partly in section, of the wire conveying means in accordance with another embodiment of the invention. In FIG. 5, in terms of its main component elements, the wire conveying means comprises a substantially hollow cylindrical guide member 223, a substantially tubular nozzle member 240, and a substantially tubular case member 231.

The guide member 223 has an unillustrated inlet portion, a main body portion 223a for guiding the wire electrode 1 by allowing the wire electrode 1 to pass through its interior, and a branch portion 223c for separating the working fluid 60a from the main body portion 223a.

The nozzle member 240 has a pipe-shaped trunk portion 240b having a hollow portion, a tip portion 240c which is formed in such a manner as to taper off from the trunk portion 240b, and a collar portion 240a provided on the side away from the tip portion 240c. The nozzle member 240 is engaged on an outer peripheral surface of the main body portion 223a of the guide member 223 in such a manner as to be slidably movable thereon through a seal packing 227 fixed in a groove 240g provided in an inner peripheral surface of the collar portion 240a.

The case member 231 has a side surface portion to which the branch portion 223c of the guide member 223 is connected. The case member 231 is engaged on an outer peripheral surface of the collar portion 240a of the nozzle member 240 in such a manner as to be slidably movable thereon through a seal packing 229 fixed in a groove 240e provided in an outer peripheral surface of the collar portion 240a of the nozzle member 240. Similarly, the trunk portion 240b of the nozzle member 240 is also slidably engaged on and hermetically fixed on the outer peripheral surface of the main body portion 223a of the guide member 223.

A spring 250 is interposed which shrinks when the fluid 60a flowing out from the branch portion 223c of the guide member 223 flows into a space formed by the case member 231 and the collar portion 240a of the nozzle member 240, and the hydraulic pressure of the fluid 60a is applied to the collar portion 240a of the nozzle member 240. The spring 250 is extended when the hydraulic pressure is canceled. Namely, a fluid driving means is formed wherein the tip of the nozzle member 240 is moved to the vicinity of the opposing portions of the capstan roller 34 and the pinch roller 36 by the hydraulic pressure of the fluid 60a, whereas the tip of the nozzle member 240 is moved away from the side of the opposing portions when the influx of the fluid 60a substantially stops.

Next, referring to FIG. 5, a description will be given of the operation of the wire electrical discharge machine constructed as described above. The second pump 66 is started, and the working fluid 60a pumped up from the storage tank 60 passes through the interior of the inlet portion 122a, the main body portion 223a of the guide member 223, and the branch portion 223c thereof, and passes through the nozzle member 240. At the same time, the fluid 60a flowing out from the branch portion 223c presses the side surface of the collar portion 240a of the nozzle member 240, the nozzle member 240 compresses the spring 250 by means of this pressing force, and the tip of the nozzle member 240 is thus fed automatically to a wire taking-up means 30. Thereupon, the wire electrode 1 is inserted into the nip formed by the opposing surfaces of the capstan roller 34 and the pinch roller 36 by the conveying force of the working fluid 60a, and the wire electrode 1 automatically drops into the collecting box.

When this drop is detected by the unillustrated detector to stop the second pump 66, and the supply of the working fluid is stopped, the flow of the fluid 60a in the interior of the inlet portion 122a, the main body portion a of the guide member 223, the branch portion 223c thereof, and the nozzle member 240 substantially stops. Consequently, the amount of the fluid 60a flowing out from the branch portion 223c becomes small, so that the pressing of the side surface of the collar portion 240a of the nozzle member 240 is canceled. Hence, as the spring 250 is extended, the nozzle member 240 returns to its initial position.

As described above, the wire electrical discharge machine according to a first aspect of the invention comprises: a wire electrode for causing electrical discharge to take place between the same and a workpiece; a first roller and a second roller for feeding the wire electrode while nipping the same; wire conveying means for inserting the wire electrode into a nip between the first roller and the second roller by causing a fluid to flow to opposing portions of the first roller and the second roller; and driving means for moving a distal end of the wire conveying means to a vicinity of the opposing portions, and for moving the distal end of the wire conveying means away from the opposing portions a predetermined distance upon completion of the insertion of the wire electrode into the nip between the first roller and the second roller. Accordingly, an advantage is offered in that the reliability of inserting the wire electrode into the nip between the first roller and the second roller improves, and since the fluid is difficult to come into contact with the rollers after completion of the insertion, the wire electrode is difficult to become entangled with the first and second rollers.

In accordance with the wire electrical discharge machine according to a second aspect of the invention, since the wire conveying means is provided with a hole formed there, in addition to the advantage of the first aspect of the invention, an advantage is offered in that the predetermined distance from the opposing portions of the first roller and the second roller to the distal end of the conveying means can be shortened.

In accordance with the wire electrical discharge machine according to a third aspect of the invention, there is provided a wire electrical discharge machine characterized by comprising: a wire electrode for causing electrical discharge to take place between the same and a workpiece; a first roller and a second roller for feeding the wire electrode while nipping the same; and wire conveying means for inserting the wire electrode into a nip between the first roller and the second roller by causing a fluid to flow to opposing portions of the first roller and the second roller, wherein the wire conveying means includes a guide member for guiding the wire electrode by allowing the wire electrode to be inserted in a hollow portion of a main body thereof, a nozzle member engaging on an outer peripheral surface of the guide member in such a manner as to be slidably movable thereon, and fluid driving means for moving a tip of the nozzle member to a vicinity of the opposing portions by the hydraulic pressure of the fluid, and for moving the tip of the nozzle member away from the opposing portions when the influx of the fluid substantially stops. Accordingly, since the tip of the nozzle member can be moved freely without requiring a driving unit such as a cylinder, an advantage is offered in that the mechanism of the wire conveying means can be simplified.

In accordance with the wire electrical discharge machine according to a fourth aspect of the invention, there is provided a wire electrical discharge machine characterized by comprising: a wire electrode for causing electrical discharge to take place between the same and a workpiece; a first roller and a second roller for feeding the wire electrode while nipping the same; and wire conveying means for inserting the wire electrode into a nip between the first roller and the second roller by causing a fluid to flow to opposing portions of the first roller and the second roller, wherein the wire conveying means includes: a guide member for guiding the wire electrode by allowing the wire electrode to be inserted in a hollow portion of a main body thereof, the guide member having a branch portion from which the fluid is separated; a nozzle member having a trunk portion provided with a hollow portion engaged slidably on an outer peripheral surface of the main body portion of the guide member, a tip portion which tapers off from the trunk portion, and a collar portion provided on a side of the nozzle member away from the tip portion; a substantially tubular case member which is slidably engaged on outer peripheral surfaces of the collar portion and the trunk portion of the nozzle member, which is fixed to an outer peripheral surface of the main body portion of the guide member, and which is connected to an outlet of the branch portion of the guide member; and a resilient member which is interposed between an inner surface of the case member and a side surface of the collar portion of the nozzle member, the resilient member being adapted to shrink when the hydraulic pressure of the fluid flowing out from the branch portion is applied to the collar portion of the nozzle member, and being adapted to extend as the hydraulic pressure is canceled. Accordingly, an advantage is offered in that the amount of movement of the nozzle member can be easily adjusted.

In accordance with the wire electrical discharge machine according to a fifth aspect of the invention, the predetermined distance is more than a distance at which the fluid is difficult to come into contact with the first roller and the second roller. Accordingly, in addition to the advantage of any one of the first, third, and fourth aspects of the invention, an advantage is offered in that the wire electrode is more difficult to become entangled with the first and second rollers.

As described above, the wire electrical discharge machine in accordance with the invention is suitable for such as feeding the wire.

What is claimed is:

1. A wire electrical discharge machine comprising:
   a wire electrode for causing electrical discharge to take place between the wire electrode and a workpiece;
   a first roller and a second roller for feeding said wire electrode while nipping the wire electrode;
   a wire conveying means for inserting said wire electrode into a portion between said first roller and said second roller by causing a fluid to flow to opposing portions of said first roller and said second roller; and
   a wire collector immediately following said first roller and said second roller,
   wherein said wire conveying means includes a guide member for guiding said wire electrode by allowing said wire electrode to be inserted in a hollow portion of a main body thereof, a nozzle member engaging on an outer peripheral surface of said guide member to be slidably movable thereon, and fluid driving means for moving a tip of said nozzle member to a vicinity of said opposing portions by the hydraulic pressure of the fluid, and for moving the tip of said nozzle member away from said opposing portions when the influx of the fluid substantially stops.

2. The wire electrical discharge machine according to claimed 1, wherein the predetermined distance is more than a distance at which the fluid is difficult to come into contact with said first roller and said second roller.

3. A wire electrical discharge machine comprising:
   a wire electrode for causing electrical discharge to take place between the wire electrode and a workpiece;
   a first roller and a second roller for feeding said wire electrode while nipping the wire electrode;
   a wire conveying means for inserting said wire electrode into a portion between said first roller and said second roller by causing a fluid to flow to opposing portions of said first roller and said second roller; and
   a driving means for moving a distal end of said wire conveying means to a vicinity of the opposing portions, and for moving the distal end of said wire conveying means away from the opposing portions a predetermined distance upon completion of the insertion of said wire electrode into the portion between said first roller and said second roller,
   wherein the predetermined distance is more than a distance at which the fluid is difficult to come into contact with said first roller and said second roller.

4. A wire electrical discharge machine comprising:
   a wire electrode for causing electrical discharge to take place between the wire electrode and a workplace;
   a first roller and a second roller for feeding said wire electrode while nipping the wire electrode; and
   wire conveying means for inserting said wire electrode into a portion between said first roller and said second roller by causing a fluid to flow to opposing portions of said first roller and said second roller,
   wherein said wire conveying means includes:
      a guide member for guiding said wire electrode by allowing said wire electrode to be inserted in a hollow portion of a main body thereof, said guide member having a branch portion from which the fluid is separated;
      a nozzle member having a trunk portion provided with a hollow portion engaged slidably on an outer peripheral surface of said main body portion of said guide member, a tip portion which tapers off from said trunk portion, and a collar portion provided on a side of said nozzle member away from said tip portion;

a substantially tubular case member which is slidably engaged on outer peripheral surfaces of said collar portion and said trunk portion of said nozzle member, which is fixed to an outer peripheral surface of said main body portion of said guide member, and which is connected to an outlet of said branch portion of said guide member; and a resilient member which is interposed between an inner surface of said case member and a side surface of said collar portion of said nozzle member, said resilient member being adapted to shrink when the hydraulic pressure of the fluid flowing out from said branch portion is applied to said collar portion of said nozzle member, and being adapted to extend as the hydraulic pressure is canceled.

5. The wire electrical discharge machine according to claim 4, wherein the predetermined distance is more than a distance at which the fluid is difficult to come into contact with said first roller and said second roller.

* * * * *